June 23, 1964 J. V. BAUM ETAL 3,138,770

WAVE-COUPLING PLUG-IN APPARATUS FOR WAVE GUIDE COMMUNICATION THROUGH PRESSURIZED PIPE LINE

Filed Dec. 28, 1962 4 Sheets-Sheet 1

INVENTORS;
JOSEPH V. BAUM
WILLIAM D. CLINTON

BY *Howson & Howson*

ATTYS

June 23, 1964 J. V. BAUM ETAL 3,138,770

WAVE-COUPLING PLUG-IN APPARATUS FOR WAVE GUIDE COMMUNICATION THROUGH PRESSURIZED PIPE LINE

Filed Dec. 28, 1962

4 Sheets-Sheet 2

INVENTORS:
JOSEPH V. BAUM
WILLIAM D. CLINTON

BY Howson & Howson
ATTYS

INVENTORS:
JOSEPH V. BAUM
WILLIAM D. CLINTON
BY Howson & Howson
ATTYS.

INVENTORS:
JOSEPH V. BAUM
WILLIAM D. CLINTON
BY Howson & Howson
ATTYS.

3,138,770

WAVE-COUPLING PLUG-IN APPARATUS FOR WAVE GUIDE COMMUNICATION THROUGH PRESSURIZED PIPE LINE

Joseph V. Baum, Columbus, Ohio, and William D. Clinton, Wethersfield, Conn., assignors, by mesne assignments, to American Gas Association, Incorporated, New York, N.Y., a corporation of New York Filed Dec. 28, 1962, Ser. No. 247,980
8 Claims. (Cl. 333—98)

This invention relates to wave-coupling apparatus suitable for radiating or receiving wave energy, and particularly to such apparatus which is adapted to provide for insertion of wave-coupling means through a small aperture.

In certain applications it is desirable to provide apparatus by means of which wave-coupling means may be inserted through a small aperture and into an operative position, the wave-coupling means in its operative condition having a lateral extent greater than that provided by the aperture, and by means of which the wave-coupling means may be removed through the same small aperture non-destructively so as to be available for subsequent reinsertion. As used herein, the term "wave-coupling means" or "wave-coupler" designates devices which are operative for either radiating or receiving wave energy.

For example, it has been found that wave couplers of appropriate form may be utilized to transmit and/or receive electromagnetic waves inside a metal conduit such as an ordinary gas main, even while the main is being used for normal gas supply purposes. To accomplish efficient wave-coupling, the directional axis of the wave-coupling assembly may have to be oriented along the axis of the conduit, may comprise one or a large number of elements extending transversely to the conduit axis, and may require particular spacings of these elements with respect to any apparatus used to mount the elements in position in the conduit. For example, one type of coupler suitable for such purposes comprises a plurality of rod-like dipoles each extending transverse to the axis of the conduit and each spaced from the other along said axis.

Furthermore, for convenience and flexibility and to avoid interference with normal use of the conduit as a gas main, for example, it is desirable in such instances to be able to place the wave-coupling assembly in its position in the conduit and to remove it from the conduit through an ordinary gate valve communicating with the interior of the conduit by way of a small aperture in one wall of the conduit. This makes it possible to use the wave-coupling apparatus at will at any point on the conduit at which an ordinary gate valve is mounted, without interfering with normal use of the conduit as a gas main. It is also desirable that insertion and removal of the wave-coupling apparatus be accomplished by a simple, accurate and reliable procedure, that the apparatus used be convenient and practical in form, and that the entire arrangement be such that a suitable connection for wave energy can be maintained between the wave-coupling means and the exterior of the entire apparatus.

Accordingly, it is an object of the invention to provide new and improved apparatus for readily inserting and removing a wave-coupling assembly through an aperture small compared with the size of the wave-coupling assembly when in use.

Another object is to provide such apparatus which is adapted for inserting a wave-coupling assembly into, and removing it from, a gas main by way of an aperture in a wall thereof without interfering with use of the main for normal gas supply purposes, without permitting escape of substantial amounts of gas through the aperture, and without damage to the wave-coupling elements.

A further object is to provide the latter type of apparatus in which the wave-coupling elements, in use, are spaced from each other along the axis of the gas main and extend transversely of said axis.

It is also an object to provide apparatus of the above-mentioned type in which insertion and removal of the wave-coupling assembly is accomplished by simple and non-critical mechanical motions.

Another object is to provide such apparatus which is simple, reliable and accurate in action and form.

In accordance with the invention the above objects are achieved by the provision of apparatus comprising an insertion member, such as a tube, having a portion adapted to be inserted to a predetermined distance through a small aperture, and having mounted on its insertable portion a support member bearing wave-coupling means. The support member is mounted so that it is angularly spring-biased toward a definite stop position transverse to the direction of insertion of the insertion member, but so that it can be rotated against said spring-bias to a position in line with the insertion member for purposes of passage through the small aperture. The wave-coupling means preferably comprises elongated elements spring-biased toward a definite stop position transverse to the support member, which elements can be folded generally along the axis and toward the free end of the support member against the spring-bias to permit passage through the small aperture. A sheath tube, also insertable through the aperture, surrounds the insertion member and, when the insertion tube, support member and wave-coupling means are withdrawn from the aperture, surrounds all three of these latter elements and holds them in substantial alignment with each other. Insertion can then be accomplished by inserting one end of the sheath tube into the aperture, in the preferred embodiment by way of an opened gas valve communicating with an aperture in the side wall of a gas main, and advancing the insertion member until the support member and the wave-coupling means are free of the sheath tube and spring into their predetermined positions under the influence of their respective spring-biases. A stop for the insertion member is preferably provided on a housing or other structure mounted on the apertured wall so that insertion is arrested when the desired degree of insertion of the wave-coupling means has been accomplished. Withdrawal is accomplished by retracting the insertion member while leaving the sheath means protruding through the aperture sufficiently that the support member encounters the edge of the sheath tube and is rotated by it into alignment with the insertion member before the wave-coupling means have been moved sufficiently to strike the wall surrounding the aperture. The position of the sheath tube required to achieve this action is preferably established and maintained by stop means connected to the above-mentioned housing or structure on the conduit wall.

As a further feature of the invention, the sheath tube is preferably held in its inserted position by a spring member exerting a force thereon large compared with the oppositely-directed force exerted on the sheath tube by the support member as it pivots against its spring-bias during withdrawal; and an engaging member is provided on the insertion tube which engages a corresponding engaging member on the sheath tube when the insertion member has been withdrawn sufficiently to retract the wave-coupling means into the sheath tube, so that upon further withdrawal of the insertion tube the sheath tube is also thereby withdrawn.

Preferably a keying arrangement is utilized on the insertion member to ensure that when the wave-coupling means is in position in the conduit the insertion member will be turned at the angle required to direct the wave-coupling means in the proper direction.

A simple forward-and-back motion of the insertion member is therefore all that is required for insertion and retraction, and may for example be readily provided by means of a nut fixed to the end of the insertion member remote from the conduit and a long bolt having threads engaging said nut and mounted from a structure fixed with respect to the conduit; rotation of the bolt in one direction to a definite stop position will then produce insertion of the wave-coupling means into operative position in the conduit and rotation in the opposite direction will produce withdrawal of the entire assembly past the gate valve. The valve may then be turned off and the entire insertion structure removed for test, storage, or use elsewhere. A suitable wave-energy transmission line maintains connection between the wave-coupling means and the exterior at all times.

These and other objects and features of the invention will be more fully comprehended from a consideration of the following detailed description taken together with the accompanying drawings, in which.

Figure 1:
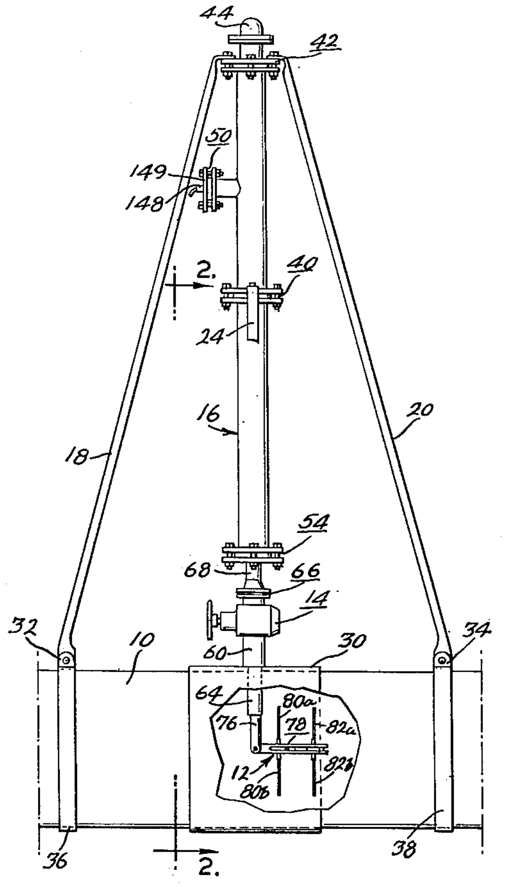
FIGURE 1 is an elevation view, partly broken away, showing the general arrangement of apparatus in accordance with the invention.
Figure 9:
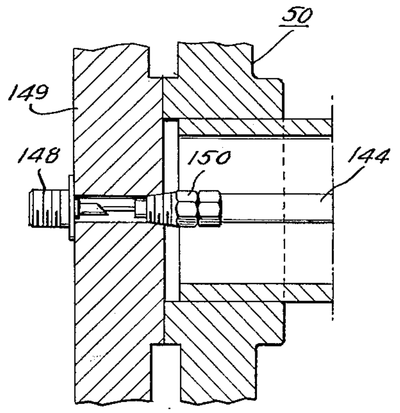
Figure 10:
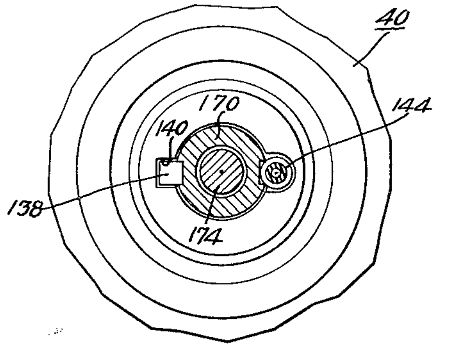
Figures 3A, 3B, 4:
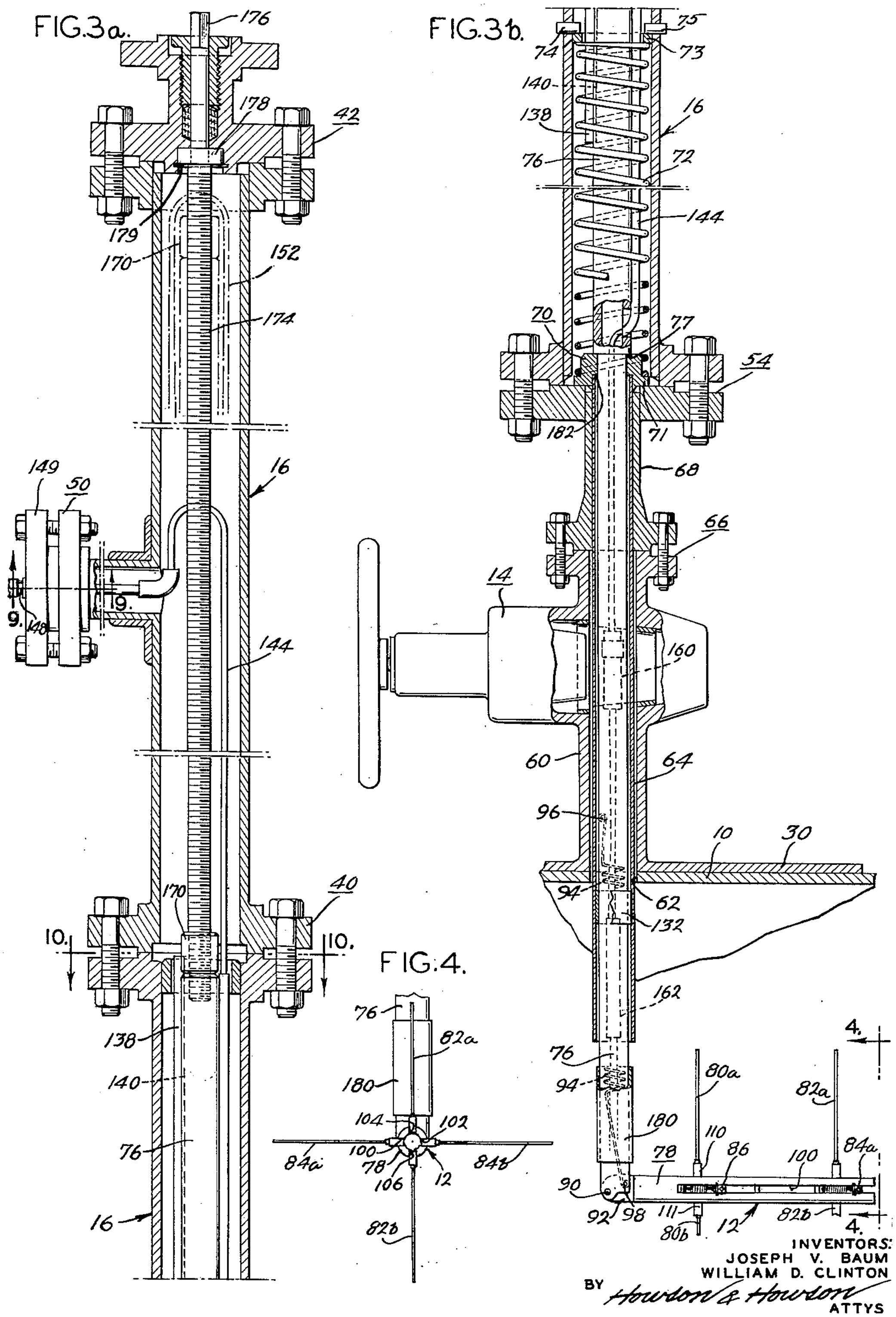
Figures 5, 6, 7, 8:
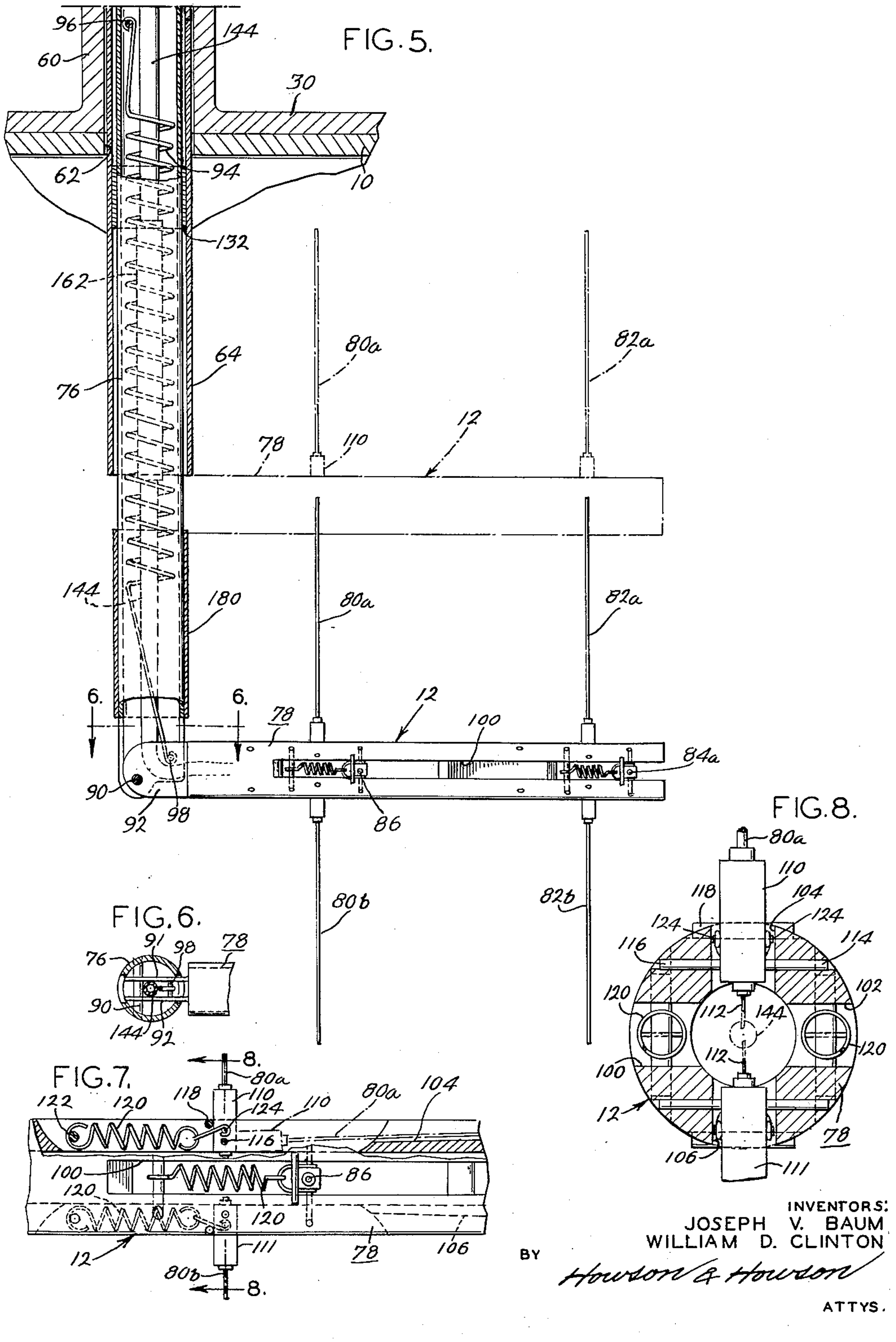

FIGURES 3*a* and 3*b* are vertical sectional views showing in more detail especially significant portions of the apparatus shown in FIGURE 1, FIGURE 3*a* showing the upper part and FIGURE 3*b* showing the lower part thereof;

FIGURE 4 is an elevational view of the lower part of the apparatus of FIGURE 3*b*, viewed along the direction 4—4;

FIGURE 5 is a more detailed sectional view of the lower portion of the apparatus shown in FIGURE 3*b*;

FIGURE 6 is a top sectional view of a lower portion of the apparatus shown in FIGURE 5, taken along the line 6—6;

FIGURE 7 is an enlarged detail view of a portion of the lower part of the apparatus shown in FIGURE 5;

FIGURE 8 is a cross-sectional view of the apparatus shown in FIGURE 7, taken along the line 8—8;

FIGURE 9 is an enlarged sectional view of a part of the apparatus of FIGURE 3*a*, taken along the line 9—9;

FIGURE 10 is an enlarged sectional view of a portion of the apparatus of FIGURE 3*a*, taken along the line 10—10; and FIGURES 11, 12, 13, 14, 15 and 15*a* are sectional views of portions of the apparatus shown in the lower-numbered figures to which particular reference is made in describing the operation of the apparatus of the invention.

Figure 2:
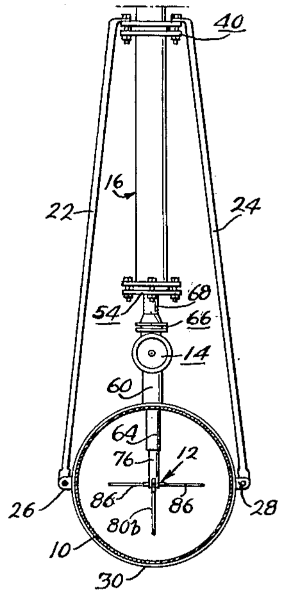
FIGURE 2 is an end view, partly in section, of the apparatus of FIGURE 1, taken on line 2—2 of FIGURE 1.

Referring now specifically to the representative embodiment of the invention shown in the drawings, in which like numerals denote like parts, FIGURES 1 and 2 show, generally, one form of apparatus in place on a cylindrical gas main 10 and adjusted so that dipole wave-couplers of the wave-coupler assembly 12 used for radiation or absorption of electromagnetic waves extend symmetrically about, and in planes normal to, the axis of the cylindrical pipe 10. This provides alignment of the directional axis of the wave-coupler 12 generally along the axis of the gas main 10 so as to permit effective transmission along, or efficient absorption from, the interior of the main of electromagnetic radiations.

Gas main 10 may be a conventional cylindrically-walled metal pipe of the type commonly used for gas conduit, through which natural gas may flow at varying, and often relatively high, rates of as much as 100 miles per hour, and under pressures which may be of the order of hundreds of pounds per square inch. While the diameter of the main may differ in various applications, it is generally related to the frequency of the electromagnetic radiations used. Thus the gas main should be of a size adapted for adequate use as a wave guide for the electromagnetic radiations involved, having a diameter sufficiently great to avoid undue attenuation of the desired propagation mode and generally not so great as to introduce propagation in other undesired modes. In one example the gas main was 30 inches in diameter and the electromagnetic wave frequency utilized was about 470 megacycles per second.

A conventional rotary gas valve 14 of the gate type is connected through a small-diameter aperture to the interior of gas main 10, and in the present example the communicating aperture between the valve and the interior of the gas main is typically of the order of 2 inches in diameter. It is by way of this valve and its associated small communicating aperture that the coupling device 12 is to be inserted into and removed from the gas main 10 at will, despite the fact that the lateral extent of the radiating elements of the wave-coupler 12 in its operating position is normally much greater than the diameter of the communicating aperture; for example, the span of a dipole for this purpose may be about 12 inches.

The outlet side of valve 14 communicates with a pressurized housing 16 which extends normally to the surface of main 10 and generally in an upward direction, and which contains the apparatus for inserting and removing the wave-coupler assembly 12. By means of the latter apparatus, the wave-coupler assembly 12 can be withdrawn through the small aperture in the gas main 10 and through valve 14, valve 14 being subsequently closed, and housing 16 and the apparatus contained therein completely removed; at a later time valve 14 may be opened and the wave-coupler assembly 12 reinserted through the small aperture in main 10 into the position shown.

To support the housing 16 and its contents and associated apparatus, any convenient mounting structure may be utilized, such as the illustrated arrangement of four 90°-spaced braces 18, 20, 22 and 24. The lower ends of braces 22 and 24 may be fastened to ears 26 and 28 respectively on a metal band 30 tightly fitted around and affixed to main 10, while braces 18 and 20 may be fastened at their lower ends to ears 32 and 34 provided on bands 36 and 38 respectively, the latter bands being disposed about and affixed to main 10. The upper ends of braces 22 and 24 may be bolted to the middle flanged pipe-coupling 40 on housing 16, while the upper ends of braces 18 and 20 may be similarly bolted to the upper flanged pipe-coupling 42 nearer the upper end of housing 16. A suitable pressurized cap 44 for housing 16 may be provided at its upper end, and a pressurized T-coupling provided on the side of housing 16 to accommodate entry into the housing of a transmission line for connection to the wave-coupler assembly 12.

Further details of the above-described elements of FIGURES 1 and 2 are shown in FIGURES 3*a* and 3*b*. FIGURE 3*a* shows the upper part of housing 16 and its associated elements, extending from the top, with the cap 44 removed, through upper pipe-coupling 42, the pressurized T-coupling 50, and the intermediate pipe coupling 40, while FIGURE 3*b* shows the remaining, lower portion of the apparatus.

As shown in FIGURE 3*b*, the gas valve 14 is mounted by an integral supporting portion 60 to the outside of gas main 10, as by welding for example. A circular aperture 62 is provided in main 10 beneath support 60 so that, when valve 14 is open as shown, a tube 64 of a suitable metal, which serves as a sheath for the wave-coupler assembly when retracted, can be positioned as shown to extend from within main 10 through aperture 62, valve 14, the flanged valve-coupling 66 and into the flanged pipe-coupling 54. Valve 14, its support portion 60, the valve-coupling 66, the flanged pipe-coupling 54 and the section of piping 68 extending between valve coupling 66 and flanged coupling 54 are all rigidly fixed in relative position with respect to main 10, while sheath tube 64 is slidably mounted within the cylindrical bore provided by the above-mentioned fixed elements. In the position shown for sheath tube 64, it is prevented from moving upwardly by abutment against a recessed shoulder in a washer-shaped metal stop member 70 having an outer shoulder 71 urged into a definite reference position against the lower flange of pipe-coupling 54 by a relatively strong compression spring 72 situated in the portion of housing 16 between pipe-coupling 54 and pipe-coupling 40. The upper end of spring 72 is retained by a suitable stop ring 73 held against upward motion by a plurality of pins such as 74 and 75 extending into the interior of housing 16. Sheath tube 64 is attached, as by soldering, to stop member 70 so as to be prevented from moving further downwardly.

Within the sheath tube 64 is located an inner insertion tube 76 extending, in the condition shown, from below the lower end of sheath tube 64 to the intermediate pipe-coupling 40, and having a shoulder 77 which, in the position of the apparatus shown in FIGURE 3*b*, bears against the upper surface of stop member 70 so as to determine the maximum insertion of the inner tube 76 into main 10.

The lowermost end of inner tube 76 is connected to the wave-coupler support arm 78, which is generally in the form of a multiply-slotted pipe and which carries the actual radiating or absorbing wave-couplers, in this case rod-like dipole elements. The positions, relative spacings, orientations, sizes and natures of these dipole elements are determined by the particular electrical requirements of a given application, but in general different dipole elements may extend in different planes and the total span of each dipole element will be considerably greater than the diameter of the aperture 62 in gas main 10. In the present example four dipoles comprising eight dipole elements are used, dipole elements 80*a* and 80*b* comprising one dipole disposed parallel to tube 76 and nearest thereto. A second dipole comprising dipole elements 82*a* and 82*b* is disposed parallel to dipole elements 80*a* and 80*b* but farther from tube 76, as may be seen from FIGURES 3*b*, 4 and 5 particularly. Disposed toward the free end of support arm 78 from dipole elements 82*a* and 82*b* is another pair of dipole elements 84*a* and 84*b* disposed at right angles to the previously enumerated dipole elements, and it will be understood that in the present example another pair of dipole elements are disposed parallel to 84*a* and 84*b* along the axis 86 shown in FIGURE 3*b*.

As is shown in more detail in FIGURES 5 and 6, the wave-coupler support arm 78 is pivotably mounted from the end of insertion tube 76 by a suitable pivot pin 90 extending across tube 76, the pivot end of support arm 78 being modified to provide two parallel ears 91 and 92 through which pivot pin 90 passes. A restraining spring 94 is secured at one end to a pin 96 affixed to and within tube 76, and is attached at its other end to a pin 98 extending between the ears 91 and 92 of member 78, and provides a spring-bias tending to prevent arm 78 from extending downwardly in line with tube 76, and to fold arm 78 upward and into tube 76. However, when support arm 78 has been folded back to the right-angle position shown in FIGURES 1, 3*b* and 5 it is arrested by abutment against a positive stop member. This stop may be a specially-provided stop member or, as in the present case, the shape of the lower edge of tube 76 may be modified so that the stopping action is provided by the abutment of ears 91 and 92 of arm 78 against the tube 76 itself. The angle of arrest can be set other than at 90° by appropriate positioning of the stop. The mechanical arrangement of the above-described pivot mechanism is therefore such that support arm 78 can be rotated downwardly into line with tube 76 by sufficient force applied thereto against the tension of spring 94, but will not so rotate under its own weight or in response to normally-encountered flow of the gas within main 10. However, spring 94 is relatively weak compared with spring 72 described above.

Support arm 78 and the dipole members associated therewith are so constructed and arranged that, when free of applied external forces, each dipole element is spring-biased into the position normal to arm 78 shown in FIGURES 3*b*, 4 and 5, but is susceptible of being folded down substantially along the axis of support arm 78 in response to sufficiently large forces, applied to the dipole elements or their immediate supports along the axis of the support arm 78 and from the direction of the pivot pin 90. In the specific embodiment of the invention shown, the arrangement of the support arm and dipole elements for providing this capability is as follows.

Referring particularly to the detailed views of FIGURES 7 and 8, dipole support arm 78 is generally tubular in form but is provided with four longitudinal slots, 100, 102, 104 and 106 of FIGURE 8, each extending from the free end of support mmeber 78 to a region beyond the dipole nearest tube 76. Each dipole element is mounted in susbtantially the same general manner, and hence only one such mounting will be described here in detail. As shown in detail in FIGURES 7 and 8, each metallic dipole element such as 80*a* and 80*b* is provided at is inner end with a support mount such as 110 and 111 respectively, through which it passes, the inner end of the dipole element 80*a* for example being electrically connected by a suitable flexible connection 112 to the conductor by which electrical power is to be supplied to, or conducted from, the dipole element. The support element 110 is supported pivotally by means of a pair of opposed pivot pins 114 and 116. Each of these pivot pins has one of its ends extending into support member 110 and its other end affixed in support member 78 on opposite sides of the slot 104. Electrical insulation of dipole element 80*a* may be provided by constituting mount 110 of an insulating substance, or by surrounding element 80*a* within mount 110 with an insulating layer.

The arrangement of pivot pins 114 and 116 and of support mount 110 is such that dipole 80*a* and support member 110 may be rotated together about pivot members 114 and 116 from the erect position shown in solid line in FIGURE 7 to the folded position shown in broken line in the latter figure. However, support member 110 is normally held in the erect position against a suitable stop 118 by means of a spring 120 having one end fastened to a pin 122 on support arm 78 and having its other end fastened to a pair of pins located on opposite sides of support member 110 and above pivot pins 114 and 116, as at 124. The strength of spring 120 is such as to maintain the dipole element 80*a* in the erect position during operation despite high rates of flow of the gas in the gas main 10, but is small compared with the spring 72. As mentioned previously, each of the dipole elements is provided with substantially identical apparatus normally maintaining it erect, but permitting it to be folded downwardly along the axis of support arm 78 when sufficient force is applied to it or its mount from the direction of pivot 90.

Apparatus is also provided, some of which has been described hereinbefore, for assuring that the dipole assembly is disposed in the desired predetermined lateral position in gas main 10 and oriented in the predetermined desired direction therein. Normally this position and orientation will be such that the center line of support arm 78 lies substantially along the axis of the gas main 10. As described above, the lateral position of support member 78 is predetermined by the position of the arresting shoulder 77 on the insertion tube 76. The fixed vertical position of sheath tube 64 and the aligning action of sleeve member 132 on insertion tube 76, which sleeve fits in sliding engagement within sheath tube 64 when retracted, assure that the insertion tube 76 enter the gas main in a perpendicular direction. The arrangement of springs and stop members described previously assures that the dipole support arm 78 is oriented at right angles to tube 76.

To assure that the axis of support arm 78 is angularly positioned along the axis of the gas main 10, a key member 138, as shown especially in FIGURES 3 and 10, extends from the flanged coupling 40 downward part way toward the flanged coupling 54 and is held within a keyway 140, shown in FIGURE 10, provided on the corresponding portion of the housing 16. The angular position of the key and keyway about the axis of the insertion tube 76 is such as to maintain tube 76 and the dipole array connected thereto in the desired angular orientation within the gas main.

Electrical connection to the dipole array is provided by way of a transmission line 144, which for most of its length may be a co-axial cable and which enters the upper portion of housing 16 by way of the pressurized T-coupling 50 shown generally in FIGURE 3*a* and proceeds downwardly through housing 16 outside of the insertion tube 76 until it reaches a point just above flange member 54, where it may be passed through an opening in tube 76 to the interior thereof. From this point the transmission line runs through the interior of tube member 76 and spring member 94, through the center of the pivot arrangement between tube 76 and dipole support arm 78, and then through the center of support arm 78 to the inner ends of each of the connected dipole elements. It will be understood that in some cases the transmission line is connected only to selected ones of the dipole elements, others of the elements serving as passive directors or reflectors.

FIGURE 9 illustrates one manner in which the co-axial transmission line 144 may be connected to an external co-axial connector 148 on the outer flange 149 of coupling 50 by providing appropriate electrical connections through flange 149. When, as is described later, the dipole array assembly is withdrawn from the gas main 10, the transmission line 144 is backed up and assumes the position shown in broken line in FIGURE 3*a* at 152 and in solid line at 144 in FIGURE 15*a*.

For additional flexibility in use and in testing, an electrical coupling 160, as shown in FIGURE 3*b*, may be provided in series with the transmission line, and other electrical elements, such as matching elements, required for best electrical operation may be provided as at 162 in FIGURES 3*b* and 5. It is understood that where the transmission line may be subjected to abrasion or pinching a thick protective outer sheath may be utilized, and that where it is convenient, as in making connections in the dipole array, parallel wire transmission line may be utilized rather than co-axial cable.

To retract the dipole array from the gas main 10, as well as to insert it, a nut 170, shown in FIGURES 3*a* and 10, is fastened to the upper end of insertion tube 76 and prevented from turning by the above-described key and keyway 138 and 140. A long threaded bolt 174 then threads the interior of nut 170 and extends upwardly through housing 16 and through the upper pressurized flanged coupling 42, where it terminates in a protruding stem 176 having a square cross-section to facilitate turning with a suitable wrench. A flange 178 attached to bolt 174 rests against a bearing surface 179 in coupling 42 so that bolt 174 may be turned in either direction but is held from moving downwardly by the latter bearing arrangement. Turning of stem 176, as by means of a wrench, then causes nut 170 and the attached insertion tube 76 to move upwardly, or downwardly, within the casing 16, depending upon the direction of rotation of the stem.

FIGURES 5 and 11 through 15*a* illustrate the operation of the above-described apparatus when the dipole array is to be removed from the gas main 10. To accomplish retraction and removal, the stem 176 on thread member 174 of FIGURE 3*a* is rotated in a direction such that nut 170 climbs upwardly on threaded member 174, pulling upwardly the insertion tube 76 attached thereto. Referring to FIGURE 5, the first effect of this is to translate the support arm 78 upwardly from the position shown in solid line to that shown in broken line, in which latter position the sheath member 64 first contacts the adjacent portion of support arm 78. Sheath member 64 protrudes sufficiently into the gas main 10 that, even upon such contact the dipole elements, such as 80*a*, do not reach or press against the interior of the gas main, and damage to the dipoles from such pressing is therefore avoided. Also in the latter position, a metal sleeve 180 surrounding the lower portion of insertion tube 76, shown in FIGURES 3*b* and 5, has also slid within sheath member 64 so as to provide additional stability and centering for the structure.

Figures 11, 12, 13, 14, 15, 15A:
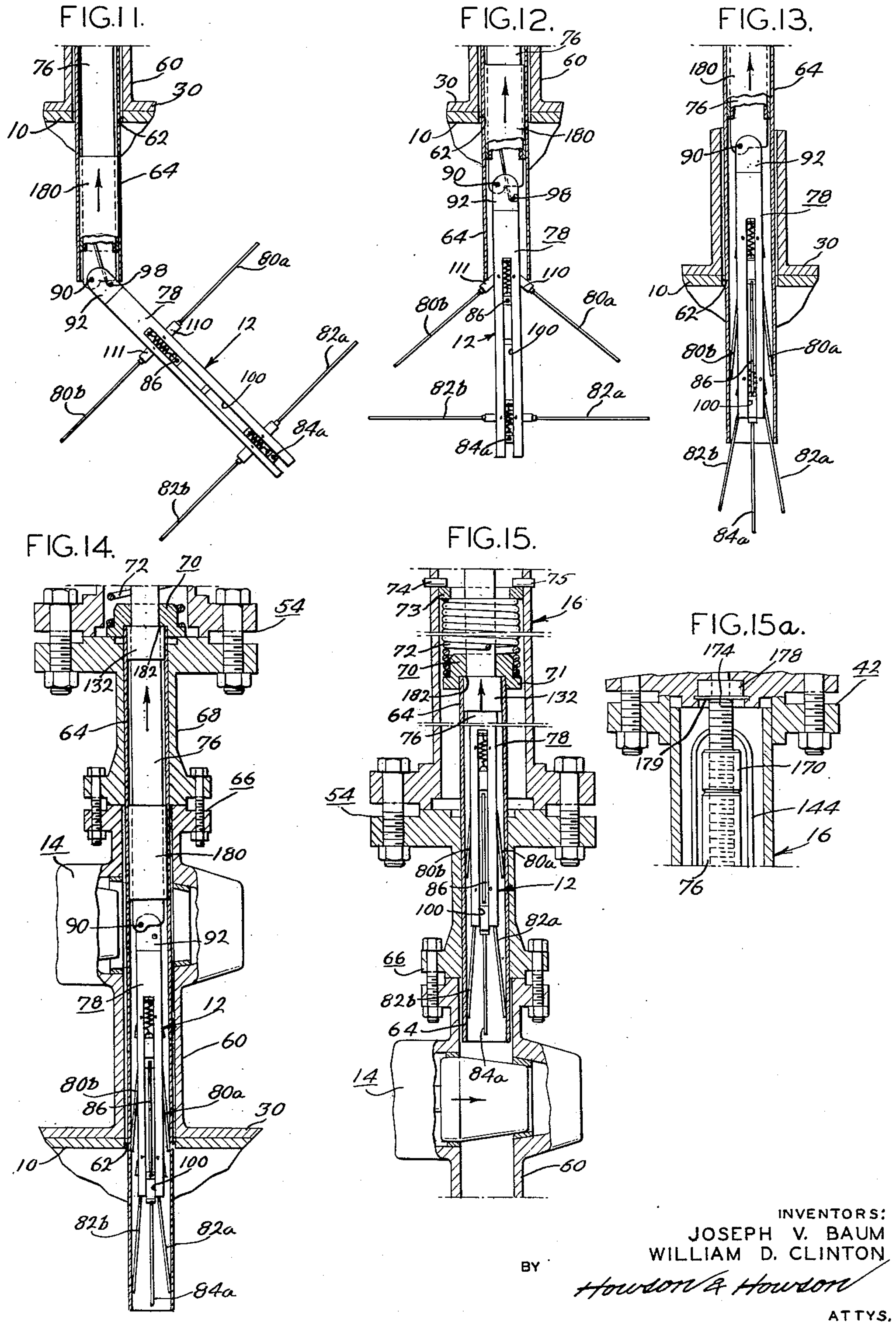

With continued turning of stem 176 the resultant upward motion of insertion tube 76 causes the upper surface of dipole support arm 78 to contact the lower edge of sheath tube 64, and with further upward motion of tube 76 support arm 78 is forced to rotate downwardly against the restraining action of spring 94 so that it enters sheath member 64 and is substantially aligned therewith. FIGURE 11 shows this condition after support arm 78 has rotated part way from its perpendicular position to its aligned position, and FIGURE 12 shows arm 78 completely aligned with tube 76. This pivoting action exerts a compressive force on spring 72, but, because of the relatively great strength of the latter spring, sheath tube 64 does not move upwardly during pivoting of arm 76.

FIGURE 12 illustrates conditions when insertion tube 76 has moved still further upward within sheath member 64 so that the end of sheath tube 64 contacts the dipole mounts 110 and 111 which carry dipole elements 80*a* and 80*b* and exerts a downward force on the dipole mounts, forcing them to fold along the axis of dipole support arm 78 upon further withdrawal, against the above-described erecting action of the springs attached to mounts 110 and 111. FIGURE 13 illustrates the same portion of the apparatus after further retraction of the dipole assembly, wherein the free end of the dipole support arm 78 has been withdrawn entirely within the sheath member 64, and all of the dipole elements have been folded at least partially.

In FIGURE 14 the condition is illustrated in which tube 76 has been drawn further upwardly to such an extent that all of the dipole elements are entirely within the sheath member 64, and in which the sleeve member 132 fastened to the exterior of insertion tube 76 contacts the inner shoulder 182 of stop member 70. Upon further rotation of stem member 176 to raise tube 76 still further, sleeve member 132 pushes upwardly against stop member 70 to raise it against the pressure of spring 72, and stop member 70, which is fastened to sheath tube 64 thereby pulls the sheath tube upwardly along with it. With continued withdrawal of the insertion tube 76, the condition shown in FIGURE 15 is reached in which spring 72 is substantially completely compressed and sheath tube 64 containing the dipole members is withdrawn completely beyond valve 14, which then may be closed as shown in FIGURE 15 to seal off the gas main from the exterior. It will be understood that in FIGURE 15 the apparent vertical extent of the apparatus has been considerably shortened by the use of the several breaks in the drawing.

As illustrated in FIGURE 15*a*, which shows the upper portion of the entire assembly in the same stage of retraction shown in FIGURE 15, the length of threaded member 174 is such that the completely retracted condition shown on FIGURE 15 occurs before the nut 170 reaches the top of member 174. In this latter condition the transmission line 144 has also been raised to a position near the top of the entire assembly, as shown.

After the condition shown in FIGURE 15 has been reached, with gas valve 14 turned off, the valve coupling 66 can be separated and the entire assembly, other than the valve and the lower part of its coupling, entirely removed from connection to the gas main. The dipole array may later be inserted through the same or a similar gas valve by reinserting the sheath tube 64 into the valve coupling, fastening the valve coupling, and turning the stem 176 in a direction opposite to that used for retraction. The procedure described above will then take place in reverse order. Thus the sheath tube 76 will move downwardly until stop member 70 seats against the lower flange of coupling device 54, at which time its lower end extends into the gas main, and with further turning of stem 176 the insertion tube 76 will advance into the gas main 10 from sheath tube 64, the dipoles springing into erect position as they emerge, and the dipole support arm 78 pivoting into its perpendicular position as its pivot emerges from the sheath tube. When the shoulder 77 of insertion tube 76 seats against the top of stop member 70, as shown in FIGURE 3*b*, the advance of tube 76 is arrested and the support arm 78 lies along the axis of the gas main as desired during electrical operation of the wave-couplers.

For the foregoing it will be appreciated that a dipole array having an extension, in each of three dimensions, much greater than the diameter of an aperture in a gas main may be introduced into and withdrawn from the gas main through the small aperture, without requiring any modification of the gas main except for the application of a conventional gas valve thereto. Furthermore, this is accomplished without producing damaging contact between any portion of the array and the walls of the gas main. The latter feature is provided by the use of the sheath tube 64 which is advanced into the gas main sufficiently to produce a pivot point for arm 78 far enough within the main to prevent contact between the dipoles and the walls of the main. The sheath tube also thereafter provides a convenient retaining arrangement for the dipole array, both for handling external to the gas main and for facilitating reinsertion into the gas main. At the same time, the structure is of sufficient strength and rigidity to remain stable when in position in the gas main, despite relatively high gas flow rates and substantial turbulence therein. This operation is obtained in accordance with the invention but merely fastening a few mounting bolts and rotating a stem in one direction to insert the array and in the other direction remove it.

It will be understood that while specific structural arrangement illustrated is particularly advantageous in providing the various features of the invention, other equivalent arrangements for performing the various mechanical and electrical functions such as raising and lowering the insertion tube and sheath tube, pivoting the dipole support arm, and pivoting the dipole elements will readily occur to one skilled in the art in view of the foregoing disclosure.

Accordingly, while the invention has been described with particular reference to a specific embodiment thereof in the interest of complete definiteness, it may also be embodied in any of a large variety of diverse forms without departing from the spirit and scope of the invention.

We claim:

1. Wave-coupler apparatus comprising:

an insertion structure having a portion adapted for insertion through an aperture in a wall;

a support member mounted on said portion of said insertion structure and variably orientable with respect thereto;

wave-coupling means mounted on said support member and variably orientable with respect thereto;

first means for angularly biasing said variably-oriented support member in an outward direction with respect to said insertion structure;

second means for angularly biasing said wave-coupling means in an outward direction with respect to said support member; and sheath means disposed about said insertion structure and having an end adapted to be inserted in said aperture, said sheath means and said insertion structure being movable relative to each other between a first position in which said sheath means is disposed about and in contact with said support member and said wave-coupling means to restrict outward angular motion of said support member and of said wave-coupling means, and a second position in which said portion of said insertion structure extends beyond the end of said sheath means thereby to permit said support member and said wave-coupling means each to move angularly outward in response to said first and second biasing means.

2. Apparatus in accordance with claim 1, comprising: means for mounting said insertion structure and said sheath means movably with respect to each other and with respect to said mounting means; means for retaining said sheath means in a retracted position with respect to said mounting means and for retaining said insertion structure in a retracted position in which said support member and said wave-coupling means are substantially entirely within said retracted sheath means; means for advancing said sheath means with respect to said mounting means from said retracted position thereof to a predetermined advanced position thereof; means for advancing said insertion structure with respect to said mounting means in the direction of advance of said sheath means to a predetermined advanced position for which said portion of said insertion structure extends out of said sheath means to permit said support member and said wave-coupling means each to move angularly outward; means for retracting said insertion structure from said predetermined advanced position thereor, while said sheath means remains in said predetermined advanced position thereof, until said support member and said wave-coupling means are withdrawn into said sheath means; means for further retracting said insertion structure to said retracted position thereof; and means responsive to said further retraction of said insertion structure for retracting said sheath means to said retracted position thereof.

3. Apparatus in accordance with claim 2, comprising first stop means for arresting said advancing of said sheath means to determine said predetermined advanced position thereof, second stop means for arresting said advancing of said insertion structure to determine said predetermined advanced position thereof, spring means for producing said advancing of said sheath means, and lost-motion means operating between said insertion structure and said sheath means for mechanically coupling said insertion structure to said sheath means only after said insertion structure has been retracted sufficiently to initiate withdrawal of said support means into said sheath tube.

4. Apparatus for inserting and removing a wave-coupling assembly by way of an aperture in a wall, comprising:

an insertion member having an elongated portion adapted for insertion through an aperture in a wall;

an elongated support member pivotably mounted to said portion of said insertion member and capable of being pivoted from a first position substantially in line with said portion of said insertion member to a second position substantially perpendicular thereto;

first spring means for spring-biasing said support member angularly toward said second position from said first position;

first stop means for arresting angular motion of said support member at said second position;

wave-coupling means comprising at least one wave-coupler element pivotably mounted on said support member and adapted to be rotated between a first position substantially parallel to said support member and a second position substantially perpendicular to said support member;

second spring means for spring-biasing said at least one wave-coupler element angularly toward said second position thereof from said first position thereof;

second stop means for arresting angular motion of said at least one wave-coupler element in said second position thereof;

a sheath tube surrounding said insertion member and having an end adapted to be inserted through said aperture;

a housing structure for mounting said sheath tube and said insertion member movably with respect to each other and to said housing structure;

means for positioning said insertion member and said sheath tube in a retracted position so that said support member and said wave-coupler element are within said sheath tube and substantially in line with said insertion member;

means for advancing said sheath tube and said insertion member with respect to said housing structure to a first predetermined advanced position;

means for further advancing said insertion tube to a second, predetermined advanced position for which said portion thereof extends beyond said one end of said sheath tube whereby said support member and said wave-coupler element are free to assume said respective second positions thereof;

means for retracting said insertion member to said retracted position thereof from said second predetermined advanced position thereof;

means for maintaining said sheath tube in said first predetermined advanced position thereof while said insertion member is being retracted until said support member contacts said sheath tube; and means providing a driving relationship between said insertion member and said sheath tube when said insertion tube is retracted beyond the point at which said support member contacts said sheath tube, to move said sheath tube with said insertion member upon further retraction of said insertion member.

5. Apparatus in accordance with claim 4, comprising third spring means stiff compared with said first spring means for urging said sheath tube from said retracted position thereof toward said first predetermined advanced position thereof, third stop means for engaging said sheath tube to establish said first predetermined advanced position thereof, and fourth stop means for engaging said insertion tube to establish said second, predetermined advanced position thereof.

6. Apparatus for providing radiation or reception of electromagnetic wave energy, comprising:

a gas main having an aperture in a wall thereof;

a gate valve on said main and communicating with said aperture for controlling flow of gas from said aperture, said valve when open providing a straight passage extending from said aperture to the outlet side of said valve and normal to said main;

a pressurized housing connected to and communicating with said outlet side of said valve and fixed in position with respect to said valve;

a rigid sheath tube disposed longitudinally in said passage and in such position as to penetrate into and toward the center of said main for a predetermined distance, said sheath tube being movable along its axis relative to said main;

first spring means for urging one end of said sheath tube into said main;

first stop means for limiting said penetration of said sheath tube into said main at said predetermined distance;

an insertion tube disposed longitudinally within said sheath tube in a predetermined position such that one end thereof is located in said main beyond said one end of said sheath tube and substantially at the center of the cross-section of said main, said insertion tube being longitudinally movable with respect to said main;

second stop means for limiting advance of said insertion tube into said main at said predetermined position thereof;

a wave-coupler support arm pivotably mounted at one end to said one end of said insertion tube;

third stop means for preventing pivoting of said arm past a position substantially normal to said insertion tube;

second spring means for spring-biasing said arm angularly away from a position in line with and beyond said insertion tube, and against said third stop means;

elongated wave-coupler elements pivotably mounted along and transverse of said support arm, at least one of said elements extending toward, but short of, said wall of said main containing said aperture;

fourth stop means for arresting pivoting of said elements at a position substantially normal to said arm;

third spring means for biasing said elements angularly against said fourth stop means and toward said pivoted end of said arm;

electrical connection means extending into said housing and electrically connected to at least one of said elements;

drive means within said housing and operable from without said housing for advancing said insertion tube into said predetermined position thereof and for withdrawing said insertion tube, and said support arm and said wave-coupler elements connected thereto, past said valve;

means cooperating between said insertion tube and said sheath tube for retaining said sheath tube in said main until said support arm contacts it during initial withdrawal of said insertion tube and for removing said sheath tube from said main and past said tube upon continued withdrawal of said insertion tube.

7. Apparatus in accordance with claim 6, in which said first spring means is stiff compared with said second spring means.

8. Apparatus in accordance with claim 7, in which said drive means comprises a first threaded member fixed to said insertion member, a second threaded member threadingly engaging said first threaded member, and means for mounting said second threaded member rotatably, but in fixed translational position, with respect to said housing.

No references cited.